United States Patent Office 2,925,825
Patented Feb. 23, 1960

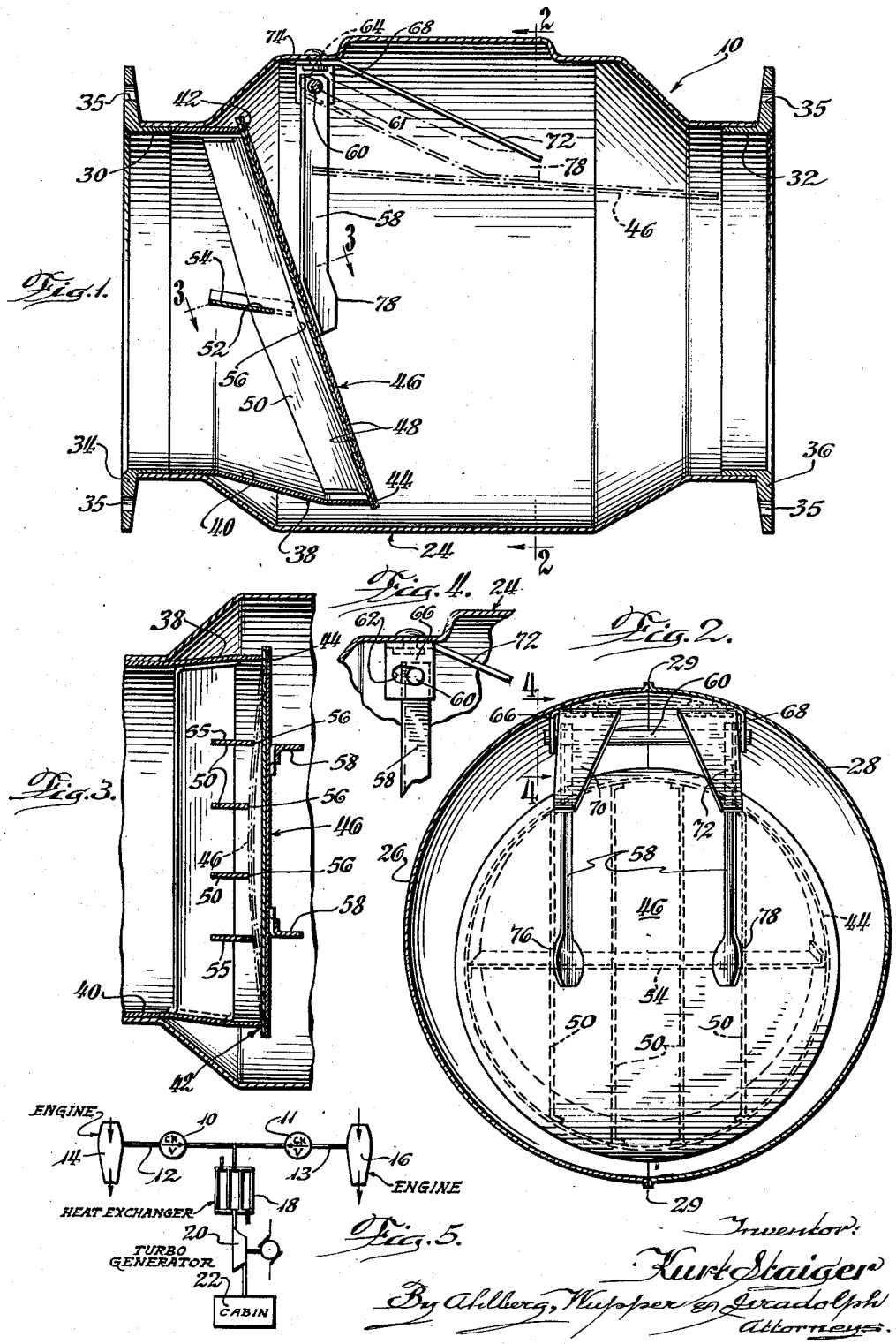

2,925,825

HIGH PERFORMANCE CHECK VALVE

Kurt Staiger, Indianapolis, Ind., assignor to Stewart-Warner Corporation, Chicago, Ill., a corporation of Virginia Application May 4, 1954, Serial No. 427,584

10 Claims. (Cl. 137—514)

The present invention relates to an improved, high performance check valve having extraordinary functional capabilities desired of check valves to be used in aircraft for bleeding high temperature air under pressure from gas turbine type propulsion engines for auxliary use.

An appreciation of worthwhile features of the improved valve is facilitated by reference to exacting functional requirements which it fulfills in service. The valve must pass a stream of air approximately four inches in diameter and heated to about 700° F. under about 300 pounds per square inch pressure, with no substantial pressure drop in the valve. Moreover, the valve must be capable of self operation to move from fully open to closed position in less than four hundredths of a second under a differential back pressure in the order of one hundred pounds per square inch. Leakage against reverse flow should be a minimum and the valve should withstand several thousand opening and closing cycles without damage. Moreover, the valve must be very light in weight.

One object of the invention is to provide an improved, high performance check valve having extraordinary functional capabilities capable of fulfilling exacting structural and functional requirements typified by those outlined above.

A more specific object is to provide a lightweight, free flow check valve of large size which is self operating to shift quickly between open and closed positions.

A further object is to provide a long life check valve of this character which is capable of smoothly dissipating the kinetic energy of the working parts incident to quick opening and closing movement without damage to the valve structure. A related object is to provide a fast acting, large size check valve in which a highly effective seal against reverse fluid flow is provided by simplified valve structure capable of withstanding repeated impacts without damage.

Other objects and advantages will become apparent from the following description of the form of the invention shown in the drawing, in which:

Figure 1 is a longitudinal sectional view of a check valve embodying the invention, showing initial engagement of the valve closure member with its seat;

Fig. 2 is a transverse sectional view taken along line 2—2 of Fig. 1;

Fig. 3 is a fragmentary sectional view taken along the line 3—3 of Fig. 1 and illustrating in phantom the valve closure member deflected into engagement with its medial supports;

Fig. 4 is a fragmentary sectional view taken along the line 4—4 of Fig. 2 and showing support structure for the valve closure member upon initial engagement of the closure member with its seat; and Fig. 5 is a diagrammatic illustration of two valves incorporated into an aircraft auxiliary system.

As indicated diagrammatically in Fig. 5, two check valves 10, 11 are connected into two ducts 12, 13 used to bleed high temperature air under pressure from the compressor sections of two turbo jet engines 14, 16 of an airplane (not shown). The two ducts 12 and 13 merge together downstream of the check valves 10, 11 and lead into a heat exchanger 18 supplied with ram air from a suitable air scoop or the like (not shown). The ram air heated in the exchanger 18 is used to warm wing sections and other portions of the plane (not shown) as an anti-icing measure. After passing through the heat exchanger 18, the high pressure air from the engines 14, 16 may be used to drive a turbo generator 20 to supply electric power. The still warm air exhausted from the generator turbine may be used to heat cabin space 22 in the airplane. It will be understood that the number of auxiliary units and purposes served by air bled from the two engines 14 and 15 may be varied on different aircraft.

The air bled from the engines 14 and 16 through the check valves 10 and 11 will ordinarily have a pressure of about 200 pounds per square inch and a temperature of approximately 700° F. The rate at which air is bled from the engines 14, 16 in a typical installation requires that the ducts 12 and 13 which carry the air to the valves 10 and 11 be about four inches in diameter. It is highly desirable that the air flow through the valves 10 and 11 without any substantial pressure drop.

So long as the pressure of the air bled from the engine 14 is substantially the same as that of air bled from the engine 16, air will flow through both check valves 10 and 11 simultaneously. However, as soon as the pressure of air from one engine falls below the pressure of air from the other engine, as for example when one engine slows up or is stopped while the other is operating normally, the check valve in the air supply duct from the low pressure engine must close immediately to prevent air rushing from the high pressure engine to the low pressure engine, which would interfere with proper operation of one or both engines, or of the auxiliary equipment. It is desirable that the check valves 10 and 11 be capable of closing from fully open position in about four hundredths of a second and maintaining a substantially airtight seal against the full pressure of air bled from the engines 14, 16.

As the pressures of air bled from the two engines 14, 16 may fluctuate many times relative to each other while the engines are operating, the check valves 10 and 11 must be capable of opening and closing for several thousand cycles without damage. Yet the valves must be light in weight for aircraft use.

As shown in Fig. 1, the check valve 10, which is similar in construction to the check valve 11, comprises a centrally enlarged casing 24 of generally cylindrical shape. The casing is formed in two longitudinal half sections 26, 28 seam welded together at 29. (See Fig. 2.) Opposite ends of the casing 24 are necked down to define a circular inlet 30 and a circular outlet 32 axially aligned with each other and having diameters smaller than that of the central portion of the casing.

A circular flange 34 having spaced bolt holes 35 adapted for connection with the duct 12 (not illustrated in Fig. 1) is welded into the valve casing inlet 30, located at the left end of the casing as shown in Fig. 1. A similar flange 36 is fastened into the casing outlet 32 to connect with a continuation of the duct 12 (not illustrated in Fig. 1) leading to the heat exchanger 18.

A cylindrical insert 38 fastened in the necked down inlet end of the casing 24 extends a short distance into the enlarged central portion of the casing to define a fluid passageway 40 opening through the casing to the outlet 32. The inner end of the insert 38 is enlarged somewhat downwardly and laterally, as shown in Figs. 1 and 2, and shaped to form a valve seat 42 disposed in a plane inclined upwardly from the lower edge of the insert and outwardly toward the inlet 30 at an angle of approximately 20° to a perpendicular to the axis of fluid flow through the passageway 40. The periphery of the valve seat 42 defines a coplanar abutment surface 44 on the extreme inner end of the insert 38 having substantial radial width.

Reverse flow of fluid through the passageway 40 is prevented by a generally flat, lightweight closure member 46 of flexible metal construction. The closure member 46 is shaped and dimensioned to slightly overlap the valve seat surface 44 when the member is moved into valve closing position, Figs. 1 to 3.

To minimize its inertia and at the same time give it considerable radial flexibility, the closure member 46 is made from two noncorrosive metal laminae 48 centrally fixed together but otherwise freely slidable one on the other.

Supplementary support for the central portion of the closure member 46 is provided by four vertical support members 50 formed from thin, flat lengths of metal mounted in the passageway 40 on the upstream side of the valve seat 42. Opposite ends of each support 50 are flanged and welded to the inner surface of the insert 38. The supports 50 are spaced horizontally in parallel relation to each other and to the axis of fluid flow through the passageway 40.

Transversely aligned slots 52 in the central portions of the respective support members 50 open outwardly toward the inlet 30 to receive a generally horizontal reinforcing plate 54 extending transversely across the passageway 40. The reinforcing plate 54 is tilted upwardly toward the inlet 30 at a slight angle to the horizontal attached at opposite ends to the insert 38. Longitudinally spaced slots 55 in the forward edge of the reinforcing plate 54 embrace opposite sides of the respective support members at the bases of the slots 52 which receive the reinforcing plate.

The edge of each support member 50 adjacent the plane of the valve seat 42 is progressively relieved from opposite ends toward the center of the member to present a slightly concave closure member support surface 56 (see Figs. 1 and 3). Opposite ends of each concave support surface 56 approach the plane of the valve seat surface 44. The maximum displacement of the support surfaces 56 of the two central support members 50 from the plane of the valve seat surface 44 is made somewhat greater than that of the support surfaces of the two outermost support members to allow increased deflection of the central portion of the closure 46.

The closure member 46 is swingably supported by two elongated hinge members 58 welded to the medial portion of the closure member in horizontally spaced, parallel relation to each other. The hinge members 58 are positioned at an acute angle to the closure member 46 to extend vertically upward from the latter when it is seated against the inclined valve seat 42. Each member 58 is shaped to have a right angled transverse section to resist bending moment.

A horizontal pintle 60 extends through apertures 61 in the upper end of the hinge members 58. Opposite ends of the pintle are supported in elongated slots 62, 64 in two flat projections 66, 68 turned downwardly from the bases of two generally flat, cantilever spring members 70, 72 riveted to a horizontal, flattened portion 74 of the casing 24. The axes of elongation of the two support slots 62, 64 are parallel to each other and inclined upwardly at an acute angle to the plane of the valve seat surface 44.

From a base riveted to the casing flat 74, each cantilever spring 70, 72 is inclined downwardly toward the outlet 32 and tapered progressively from its base to its free end.

Protuberances 76, 78 formed on the ends of the two hinge members 58 attached to the closure member 46 are adapted to engage the free ends of the springs 70, 72 upon swinging movement of the closure member 46 away from the valve seat 42 to its open position, indicated in phantom in Fig. 1.

A review of the operation of the check valve 10 may start with the assumption that the air pressure at the inlet 30 is increased above the pressure at the outlet 32. The differential pressure on the closure member 46 immediately swings the member away from the valve seat 42 to its fully open position to allow a free flow of air through the valve.

Opening movement of the closure member is checked by engagement of the abutment protuberances 76, 78 with the springs 70, 72. The springs 70, 72 smoothly decelerate the closure member and return it to its normal open position shown in phantom in Fig. 1. Due to the mounting of the springs 70, 72 off center from the closure member support pintle 60, the upward movement of the closure member 46 against the springs and also the initial return movement of the closure member by the springs produces a frictional sliding movement of the springs over the abutments 76, 78. This frictional action dissipates the kinetic energy of the closure member and the energy transmitted to the springs.

It is noteworthy that the hinge pintle 60 is located above and axially downstream of the adjacent upper edge of the valve seat 42 in relation to the direction of air flow through the valve casing 24. As a consequence the upper edge of the closure member 46 is carried radially downward in relation to the valve seat 42 as an incident to opening movement of the closure member.

When the closure member is in its fully open position shown in phantom in Fig. 1, the closure member 46 is held in a generally horizontal attitude slightly inclined downward toward the outlet 32. Thus positioned within a portion of the passing air stream, it is steadily supported by an airfoil action against the springs 70, 72 without fluttering and without disturbing the smooth laminar flow of air through the valve.

Air flows smoothly through the open valve 10 without any significant drop in pressure. The axial alignment of the inlet 30 and outlet 32 of the valve together with the effective elimination of air flow deflecting structure within the valve casing 24 allows the air to flow smoothly through the valve without appreciable turbulence. The flat support members 50 and the reinforcing plate 54, as well as the open closure member 46, present narrow edges toward the inlet 30 which cut through the passing air stream without creating any appreciable turbulence in the air or introducing a drag.

When the pressure of air at the inlet 30 drops below the pressure at the outlet 32, the closure member 46 immediately swings downward into engagement with the valve seat 42 to block reverse air flow. This closing movement of the member 46 is accelerated by differential air pressure on the rather large area of the member. Due to the light weight of the closure member and the relatively large closing forces, the member is swung from fully open to closed position almost instantly.

Initial contact between the flat closure member 46 and the valve seat 42 is spread over the entire circular flat abutment surface 44, thus eliminating any deformation of either the valve seat or the closure member. Moreover, the intensity of the impact of the fast moving closure member 46 on the valve seat 42 is greatly reduced by the flexibility of the closure member which provides for a substantial deflection or deformation of the central portion of the closure member toward the inlet 30, as shown in phantom in Fig. 3.

This deflection of the closure member 46 after engagement with the valve seat surface 44, tends to move the hinge members 58, rigidly attached to the central portion closure member, in a direction generally perpendicular to the inclined plane of the valve seat 42. However, due to the stiffness of the hinge members, they slide the pintle 60 in the slots 62, 64 toward the plane of valve seat 42.

This slides the closure member 46 generally upwardly along the valve seat against the heavy frictional drag which absorbs a large portion of the kinetic energy of the closure member.

The sliding movement of the closure member 46 on the valve seat 42 produced by the action of the pintle 60 in the slots 62, 64, as an incident to deflection of the closure member, minimizes the impact of the closure member on the valve seat and suppresses any tendency of the closure member to recoil.

In this connection it should be pointed out further that deflection or deformation of the closure member 46 after engagement with the valve seat 42 twists the horizontally spaced ends of the hinge members 58 attached to the closure member in opposite directions. The resulting torsional deflection of the hinge members 58 resists the deflection of the closure member toward the supports 50 to further reduce its impact on the valve seat 42.

Deflection of the closure member 46 after engagement with the valve seat 42 is limited by the support members 50, which support the member against air pressure applied at the outlet side of the closure. The closure member 46 need have only sufficient strength to sustain the air pressure on its relatively small segmental areas defined by the valve seat 42 and the support members 50. Consequently, the closure member can be made very thin and light in weight to minimize its inertia and thus increase its capability of moving quickly between open and closed positions.

Deflection of the closure member 46 into engagement with the supports 50 reduces the abutting engagement of the valve seat surface 44 with the closure member to only line contact which forms an effective seal against reverse air flow. Repeated closing of the valve under high reverse pressures does not damage the very narrow effective sealing surfaces on the radially inward edge of the valve seat surface 44 and the closure member 46 because the initial closing impact of the member 46 is spread over the entire area of the flat valve seat surface as previously explained.

The improved check valve thus provided is very light in weight and capable of meeting the extraordinary functional requirements demanded of aircraft auxiliary air supply systems of the type described.

While I have shown and described a preferred embodiment of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. A fast acting check valve comprising, in combination, casing means defining an inlet and an outlet and a passageway therebetween, means defining a valve seat encircling the passageway, a generally flat flexible closure member engageable with the valve seat, movable support means fixed to the closure member, a pivotal mount for the closure member support means on the casing means, and said pivotal mount including a member slidable in an elongated slot having an axis of elongation disposed at an angle to a perpendicular to the plane of the valve seat whereby deflection of the closure member after engagement with the valve seat acts through the closure member support means to shift the slidable member through the slot of the pivotal mount to slide the closure member transversely on the valve seat for dissipating the energy thereof.

2. A fast acting, low resistance check valve comprising, in combination, an annular valve seat forming a central valve opening therethrough and defining an abutment surface encircling said opening and facing downstream therefrom in contiguous relation to a single plane, a hollow casing encircling said valve seat and having an impervious connection therewith extending continuously around the seat, said casing extending downstream from said valve seat, a generally flat valve disc disposed on the downstream side of said valve seat and dimensioned to abuttingly overlap said seat abutment surface continuously around said opening, said casing having an inner periphery defining an outlet communicating through the casing with said valve opening and spaced downstream from said valve seat sufficiently to accommodate said disc positioned edgewise between the valve seat and said outlet, pivotal support means on said casing connected to said disc to support the latter for opening and closing movement about a pivotal axis which has a minimum spacing from a line extending through the center of said valve opening perpendicularly to said valve seat plane which is at least equal to the spacing from the same line of the portion of said valve seat surface nearest said pivotal axis, and said axis having a spacing downstream from said valve seat plane which is materially greater than the minimum spacing of the axis from the nearest straight line contained within said casing and extending between the inner periphery of said valve seat and said outlet defining casing periphery whereby downstream swinging movement of said disc to an open position generally parallel to a straight line between the centers of said opening and said outlet moves both the upstream and downstream edges of the disc radially into a flow stream in said casing bounded by said opening and said outlet.

3. A stabilized, fast acting check valve comprising, in combination, an annular valve seat forming a central valve opening therethrough and defining an abutment surface encircling said opening and facing downstream therefrom in contiguous relation to a single valve plane, a hollow casing encircling said valve seat and having an impervious connection therewith extending continuously around the seat, said casing extending downstream from said valve seat, a generally flat valve disc disposed on the downstream side of said valve seat and dimensioned to abuttingly overlap said seat abutment surface continuously around said opening, said casing having an inner periphery defining an outlet communicating through the casing with said valve opening and spaced downstream from said valve seat sufficiently to accommodate said disc positioned edgewise between the valve seat and said outlet, pivotal support means on said casing connected to said disc to support the latter for opening and closing movement about a pivotal axis defined by the pivotal support means and having a spacing downstream from said valve seat plane which is materially greater than the minimum spacing of the axis from the nearest straight line contained within said casing and extending between the inner periphery of said valve seat and said outlet defining casing periphery whereby downstream swinging movement of said disc toward a parallel relationship to a straight line between the centers of said valve opening and said outlet moves both the upstream and downstream edges of the disc radially into a flow stream in said casing bounded by said opening and said outlet, and a resilient spring element on said casing cantilevering into a medial portion of the casing between said seat and said outlet to yieldably resist further downstream swinging movement of said pivotal support means after said disc first reaches an open position somewhat short of a parallel relationship to said line between centers of said valve opening and said outlet.

4. A check valve comprising, in combination, a valve casing defining a passageway extending therethrough, a centrally open valve seat in said casing encircling said passageway and defining around the passageway a flat annular abutment surface having substantial radial width and facing downstream from said seat, the abutment surface defining a plane inclined at an acute angle with respect to the axis of the passageway, the inner periphery of said seat being shaped to define and expose from the downstream side of the seat a sharp edge bounding the radially inward extremity of said annular abutment surface, a valve disc formed from metallic spring material and having a thin flat shape providing pronounced flexibility in the disc, said disc being disposed within said casing for engagement with the downstream side of said valve seat and dimensioned in the plane of the disc to abuttingly overlap said abutment surface continuously around said passageway, and pivotal support means on said casing connected to said disc and supporting the latter for pivotal movement toward and away from said abutment surface by differential fluid pressure in said passageway, the pivotal support means slidably carried in the casing slot means disposed at an angle with respect to the perpendicular to the plane of the abutment surface, said flexibility in said disc providing upon engagement of the disc with said abutment surface for deflection of the central portion of the disc toward the upstream end of said passageway to form only circumferential line contact between the disc and said abutment surface, and to shift the pivotal support means through the slot means to slide the valve disc transversely on the abutment surface for dissipating the energy thereof as an incident to application to the disc of differential fluid pressure acting toward the upstream end of the passageway.

5. A check valve comprising, in combination, a valve casing defining a passageway therethrough, a centrally open valve seat in said casing encircling said passageway and defining therearound an annular abutment surface facing downstream from the seat in contiguous relation to a single plane, a valve disc having a closed position immediately adjacent said abutment surface, said disc being shaped and dimensioned to have a marginal edge which overlaps said abutment surface continuously around said passageway; said disc, including said marginal edge thereof, being formed from metallic spring material and having a thin flat shape providing great effective flexibility in the disc; a disc support member mounted in said passageway upstream from said abutment surface plane and defining thereon a disc support surface facing downstream and spaced radially inward from said valve seat to define in the passageway radial flow space between the valve seat and the support surface, said support surface being spaced upstream from the opposing portion of said disc when the disc in unstressed condition is engaged with said abutment surface, a stiff hinge member fixed to the central portion of said disc and cantilevering away from the downstream side thereof, and pivotal support means including the projecting end of said hinge member forming a pin and slot pivotal connection between said hinge member and said casing which provides for pivotal movement of said disc into engagement with said abutment surface and deflection of the medial portion of the disc into engagement with said support surface.

6. A stabilized, fast acting check valve comprising, in combination, an annular valve seat forming a central valve opening therethrough and defining an abutment surface encircling said opening and facing downstream therefrom in contiguous relation to a single valve plane, a hollow casing encircling said valve seat and having an impervious connection therewith extending continuously around the seat, said casing extending downstream from said valve seat, a generally flat valve disc disposed on the downstream side of said valve seat and dimensioned to abuttingly overlap said seat abutment surface continuously around said opening, said casing having an inner periphery defining an outlet communicating through the casing with said valve opening and spaced downstream from said valve seat sufficiently to accommodate said disc positioned edgewise between the valve seat and said outlet, pivotal support means slidably mounted for limited movement on said casing and connected to said disc to support the latter for opening and closing movement about a pivotal axis defined by the pivotal support means and having a spacing downstream from said valve seat plane which is materially greater than the minimum spacing of the axis from the nearest straight line contained within said casing and extending between the inner periphery of said valve seat and said outlet defining casing periphery whereby downstream swinging movement of said disc toward a parallel relationship to a straight line between the centers of said valve opening and said outlet moves both the upstream and downstream edges of the disc radially into a flow stream in said casing bounded by said opening and said outlet, and a resilient spring element on said casing cantilevering into a medial portion of the casing between said seat and said outlet to yieldably resist further downstream swinging movement of said pivotal support means after said disc first reaches an open position somewhat short of a parallel relationship to said line between centers of said valve opening and said outlet, the inertia of the disc acting to slide the pivotal support means along and in engagement with the spring element to dissipate the energy of the disc.

7. A fast acting check valve comprising, in combination, casing means defining an inlet and an outlet and a passageway therebetween, means defining a valve seat encircling the passageway, a generally flat flexible closure member engageable with the valve seat, a pair of spaced elongated support members rigidly fixed to the closure member on either side of its center, means pivotally supporting said support members on said casing, said means preventing relative movement of said support members with said pivotal support means about the longitudinal axis of said support members, the support members being rigid longitudinally but subject to torsional deformation, the flexibility in the closure member providing upon engagement of the closure member with the valve seat for deflection of the central portion of the closure member toward the inlet to form only circumferential line contact between the closure member and the valve seat as an incident to application to the closure member of differential fluid pressure acting toward the inlet, the deflection of the central portion of the closure member causing torsional deformation of the support members for dissipating the energy of the closure member.

8. A fast acting check valve comprising, in combination, casing means defining an inlet and an outlet and a passageway therebetween, means defining a valve seat encircling the passageway and inclined at an acute angle with respect to the axis of the passageway, a generally flat flexible closure member engageable with the valve seat, a pair of spaced elongated support members rigidly fixed to the closure member on either side of its center, means pivotally supporting said support members on said casing means, said means preventing relative movement of said support members with said pivotal support means about the longitudinal axis of said support members, the support members being rigid longitudinally but subject to torsional deformation, the flexibility in the closure member providing upon engagement of the closure member with the valve seat for deflection of the central portion of the closure member toward the inlet to form only circumferential line contact between the closure member and the valve seat as an incident to application to the closure member of differential fluid pressure acting toward the inlet, the deflection of the central portion of the closure member causing torsional deformation of the support members for dissipating the energy of the closure member.

9. A fast acting check valve comprising, in combination, casing means defining an inlet and an outlet and a passageway therebetween, means defining a valve seat for encircling the passageway, a generally flat flexible closure member engageable with the valve seat, a pair of spaced elongated support members fixed to the closure member on either side of its center, means pivotally supporting said support members on said casing means, said means preventing relative movement of said support members with said pivotal support means about the longitudinal axis of said support members, the support members being rigid longitudinally but subject to torsional deformation, said pivotal supporting means including a member slideable in an elongated slot having an axis of elongation disposed at an angle to a perpendicular to the plane of the valve seat whereby deflection of the closure member after engagement with the valve seat acts through the support members to shift the slideable member through the slot of said pivotal supporting means to slide the closure member transversely on the valve seat for partially dissipating the energy thereof upon closing of the valve, the flexibility in the closure member providing upon engagement of the closure member with the valve seat for deflection of the central portion of the closure member toward the inlet to form only circumferential line contact between the closure member and the valve seat as an incident to application to the closure member of differential fluid pressure acting toward the inlet, the deflection of the central portion of the closure member causing torsional deformation of the support members for partially dissipating the energy of the closure member upon closing of the valve.

10. The combination claimed in claim 9 together with a resilient spring element on the casing means extending to a position between the valve seat and the outlet to engage and yieldably resist movement of the closure member in an open position thereof, the inertia of the closure member acting to slide the support members along in yieldable engagement with the spring element to partially dissipate the energy of the closure member upon opening of the valve.

References Cited in the file of this patent

UNITED STATES PATENTS

| | | |
|---|---|---|
| 107,605 | Foster | Sept. 20, 1870 |
| 244,879 | Fowler | July 26, 1881 |
| 468,985 | Downs | Feb. 16, 1892 |
| 887,782 | Fiegehen | May 19, 1908 |
| 922,262 | Clemens | May 18, 1909 |
| 1,352,735 | Egerton | Sept. 14, 1920 |
| 1,800,157 | Saunders | Apr. 7, 1931 |
| 2,095,842 | Steenstrup | Oct. 12, 1937 |
| 2,359,008 | Smith | Sept. 26, 1944 |
| 2,505,757 | Dunbar | May 2, 1950 |
| 2,514,838 | Callahan | July 11, 1950 |

FOREIGN PATENTS

| | | |
|---|---|---|
| 1,119 | Italy | Oct. 18, 1884 |